(12) United States Patent
Yadav et al.

(10) Patent No.: US 11,853,444 B2
(45) Date of Patent: Dec. 26, 2023

(54) SYSTEM AND METHOD FOR SECURING INSTANT ACCESS OF DATA IN FILE BASED BACKUPS IN A BACKUP STORAGE SYSTEM USING METADATA FILES

(71) Applicant: EMC IP Holding Company LLC, Hopkinton, MA (US)

(72) Inventors: Sunil Yadav, Bangalore (IN); Shelesh Chopra, Bangalore (IN); Ravi Vijayakumar Chitloor, Bengaluru (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 287 days.

(21) Appl. No.: 17/486,099

(22) Filed: Sep. 27, 2021

(65) Prior Publication Data

US 2023/0096665 A1    Mar. 30, 2023

(51) Int. Cl.
*H04L 29/06* (2006.01)
*G06F 21/62* (2013.01)
(Continued)

(52) U.S. Cl.
CPC ...... *G06F 21/6218* (2013.01); *G06F 11/1458* (2013.01); *G06F 21/44* (2013.01); *G06F 2201/80* (2013.01)

(58) Field of Classification Search
CPC .. G06F 21/6218; G06F 11/1458; G06F 21/44; G06F 2201/80
See application file for complete search history.

(56) References Cited

U.S. PATENT DOCUMENTS 6,185,574 B1    2/2001    Howard et al.
7,694,103 B1    4/2010    Kushwah
(Continued)

FOREIGN PATENT DOCUMENTS

CN    111241062 A    6/2020
WO    2011002777 A2    1/2011
(Continued)

OTHER PUBLICATIONS

Lipika Deka et al., "Consistent Online Backup in Transactional File Systems", IEEE Transactions on Knowledge and Data Engineering, vol. 26, Issue: 11, Nov. 2014, pp. 2676-2688 (13 pages).
(Continued)

*Primary Examiner* — Shawnchoy Rahman
(74) *Attorney, Agent, or Firm* — Chamberlain, Hrdlicka, White, Williams & Aughtry

(57) ABSTRACT

Embodiments described herein relate to a method for managing file based backups (FBBs). The method may include obtaining a FBB mount request for a FBB mount of a FBB from an application, wherein the application is executing in a production host environment and the FBB is stored on backup storage; in response to the FBB mount request: capturing an entity context associated with the application; authenticating the entity context; obtaining, when the authenticating is successful, access control information corresponding to the FBB from the backup storage; determining a subset of the FBB for which the access control information indicates the entity context has permission to access; and enabling access to a portion of the FBB by the application.

20 Claims, 9 Drawing Sheets

(51) Int. Cl.
    *G06F 11/14* (2006.01)
    *G06F 21/44* (2013.01)

(56) References Cited

U.S. PATENT DOCUMENTS

| | | |
|---|---|---|
| 7,873,601 B1 | 1/2011 | Kushwah |
| 8,037,032 B2 | 10/2011 | Pershin et al. |
| 8,200,637 B1 | 6/2012 | Stringham |
| 8,214,406 B2 | 7/2012 | Kushwah |
| 9,171,002 B1 | 10/2015 | Mam et al. |
| 9,348,827 B1 | 5/2016 | Patwardhan et al. |
| 9,411,821 B1 | 8/2016 | Patwardhan et al. |
| 9,424,137 B1 | 8/2016 | Mam |
| 9,569,446 B1 | 2/2017 | Feathergill et al. |
| 10,007,445 B2 | 6/2018 | Nithrakashyap et al. |
| 10,114,705 B1 | 10/2018 | Kumar |
| 10,146,629 B1 | 12/2018 | Yadav et al. |
| 10,241,870 B1 | 3/2019 | Beatty |
| 10,346,256 B1 | 7/2019 | Levin-michael et al. |
| 10,372,547 B1 | 8/2019 | Zhu et al. |
| 10,642,790 B1 | 5/2020 | Brenner |
| 10,769,103 B1 | 9/2020 | Patwardhan et al. |
| 10,838,821 B2 | 11/2020 | Bhagi et al. |
| 11,340,824 B1 | 5/2022 | Yadav et al. |
| 11,467,914 B2 | 10/2022 | Bhagi et al. |
| 11,513,921 B1 | 11/2022 | Yadav et al. |
| 2004/0028042 A1 | 2/2004 | Srinivasan et al. |
| 2005/0078196 A1 | 4/2005 | Okamoto |
| 2005/0166082 A1 | 7/2005 | Williams et al. |
| 2005/0246398 A1 | 11/2005 | Barzilai et al. |
| 2008/0124050 A1 | 5/2008 | Deschamp et al. |
| 2009/0276591 A1 | 11/2009 | Mu et al. |
| 2010/0077161 A1 | 3/2010 | Stoakes et al. |
| 2010/0293147 A1* | 11/2010 | Snow ............... G06F 16/10 707/E17.007 |
| 2014/0068713 A1* | 3/2014 | Nicholson ............ H04W 12/06 726/3 |
| 2014/0181579 A1 | 6/2014 | Whitehead et al. |
| 2015/0127804 A1 | 5/2015 | Kripalani et al. |
| 2016/0078245 A1* | 3/2016 | Amarendran ......... G06N 20/00 713/193 |
| 2016/0127307 A1 | 5/2016 | Jain et al. |
| 2016/0188582 A1 | 6/2016 | Sprague et al. |
| 2016/0378614 A1 | 12/2016 | Thanasekaran |
| 2017/0090770 A1 | 3/2017 | Minamiura et al. |
| 2018/0095960 A1* | 4/2018 | Tan ................... G11B 27/031 |
| 2018/0225177 A1 | 8/2018 | Bhagi et al. |
| 2018/0295400 A1 | 10/2018 | Thomas et al. |
| 2018/0322017 A1 | 11/2018 | Maccanti et al. |
| 2019/0278663 A1 | 9/2019 | Mehta et al. |
| 2019/0324661 A1 | 10/2019 | Kottomtharayil et al. |
| 2020/0245034 A1 | 7/2020 | Dunker et al. |
| 2021/0026739 A1 | 1/2021 | Bhagi et al. |
| 2021/0133040 A1 | 5/2021 | Bansal et al. |
| 2021/0240569 A1 | 8/2021 | Chopra et al. |
| 2021/0326220 A1 | 10/2021 | Srinivasan et al. |
| 2021/0406129 A1 | 12/2021 | Zheng et al. |
| 2022/0083426 A1* | 3/2022 | Chopra ............ G06F 11/1451 |
| 2022/0229739 A1 | 7/2022 | Nara |
| 2022/0245034 A1 | 8/2022 | Nara et al. |
| 2022/0382641 A1 | 12/2022 | Chopra et al. |
| 2022/0398161 A1* | 12/2022 | Yadav ................. G06F 16/178 |
| 2022/0398162 A1* | 12/2022 | Yadav ................. G06F 16/188 |
| 2022/0398164 A1* | 12/2022 | Yadav ................... G06F 9/541 |
| 2022/0413967 A1 | 12/2022 | Bhagi et al. |
| 2023/0094628 A1* | 3/2023 | Yadav ............... G06F 11/1458 726/30 |

FOREIGN PATENT DOCUMENTS

| | | |
|---|---|---|
| WO | 2013086040 A2 | 6/2013 |
| WO | 2015110171 A1 | 7/2015 |
| WO | 2015142676 A1 | 9/2015 |
| WO | 2018081737 A1 | 5/2018 |
| WO | 2019099446 A1 | 5/2019 |

OTHER PUBLICATIONS

Jing Xing et al, "Memory Based Metadata Server for Cluster File Systems", 2008 Seventh International Conference on Grid and Cooperative Computing, pp. 287-291 (Year: 2008).

* cited by examiner

SYSTEM AND METHOD FOR SECURING INSTANT ACCESS OF DATA IN FILE BASED BACKUPS IN A BACKUP STORAGE SYSTEM USING METADATA FILES

BACKGROUND

Computing devices in a system may include any number of internal components such as processors, memory, and persistent storage. The storage of data across multiple computing devices may require significant use of such internal components. Performing deduplication on such data prior to storage may improve the overall operation of such computing devices.

SUMMARY

In general, in one aspect, embodiments described herein relate to a method for managing file based backups (FBBs). The method may include obtaining, by a FBB metadata file manager, a FBB mount request for a FBB mount of a FBB from an application, wherein the application is executing in a production host environment and the FBB is stored on backup storage; in response to the FBB mount request: capturing, by the FBB metadata file manager, an entity context associated with the application; authenticating, by the FBB metadata file manager, the entity context; obtaining, by the FBB metadata file manager and when the authenticating is successful, access control information corresponding to the FBB from the backup storage; determining, by the FBB metadata file manager, a subset of the FBB for which the access control information indicates the entity context has permission to access; and enabling, by the FBB metadata file manager, access to a portion of the FBB by the application.

In general, in one aspect, embodiments described herein relate to a non-transitory computer readable medium that includes computer readable program code, which when executed by a computer processor enables the computer processor to perform a method for managing file based backups (FBBs). The method may include obtaining, by a FBB metadata file manager, a FBB mount request for a FBB mount of a FBB from an application, wherein the application is executing in a production host environment and the FBB is stored on backup storage; in response to the FBB mount request: capturing, by the FBB metadata file manager, an entity context associated with the application; authenticating, by the FBB metadata file manager, the entity context; obtaining, by the FBB metadata file manager and when the authenticating is successful, access control information corresponding to the FBB from the backup storage; determining, by the FBB metadata file manager, a subset of the FBB for which the access control information indicates the entity context has permission to access; and enabling, by the FBB metadata file manager, access to a portion of the FBB by the application.

In general, in one aspect, embodiments described herein relate to a system for managing file based backups (FBBs). The system may include a processor, memory, and a FBB metadata file manager. The FBB metadata file manager may be configured to: obtain a FBB mount request for a FBB mount of a FBB from an application, wherein the application is executing in a production host environment and the FBB is stored on backup storage; in response to the FBB mount request: capture an entity context associated with the application; authenticate the entity context; obtain, when the authentication is successful, access control information corresponding to the FBB from the backup storage; determine a subset of the FBB for which the access control information indicates the entity context has permission to access; and enable access to a portion of the FBB by the application.

Other aspects of the embodiments disclosed herein will be apparent from the following description and the appended claims.

BRIEF DESCRIPTION OF DRAWINGS

Certain embodiments described herein will be described with reference to the accompanying drawings. However, the accompanying drawings illustrate only certain aspects or implementations of the embodiments by way of example and are not meant to limit the scope of the claims.

DETAILED DESCRIPTION

Figure 1:
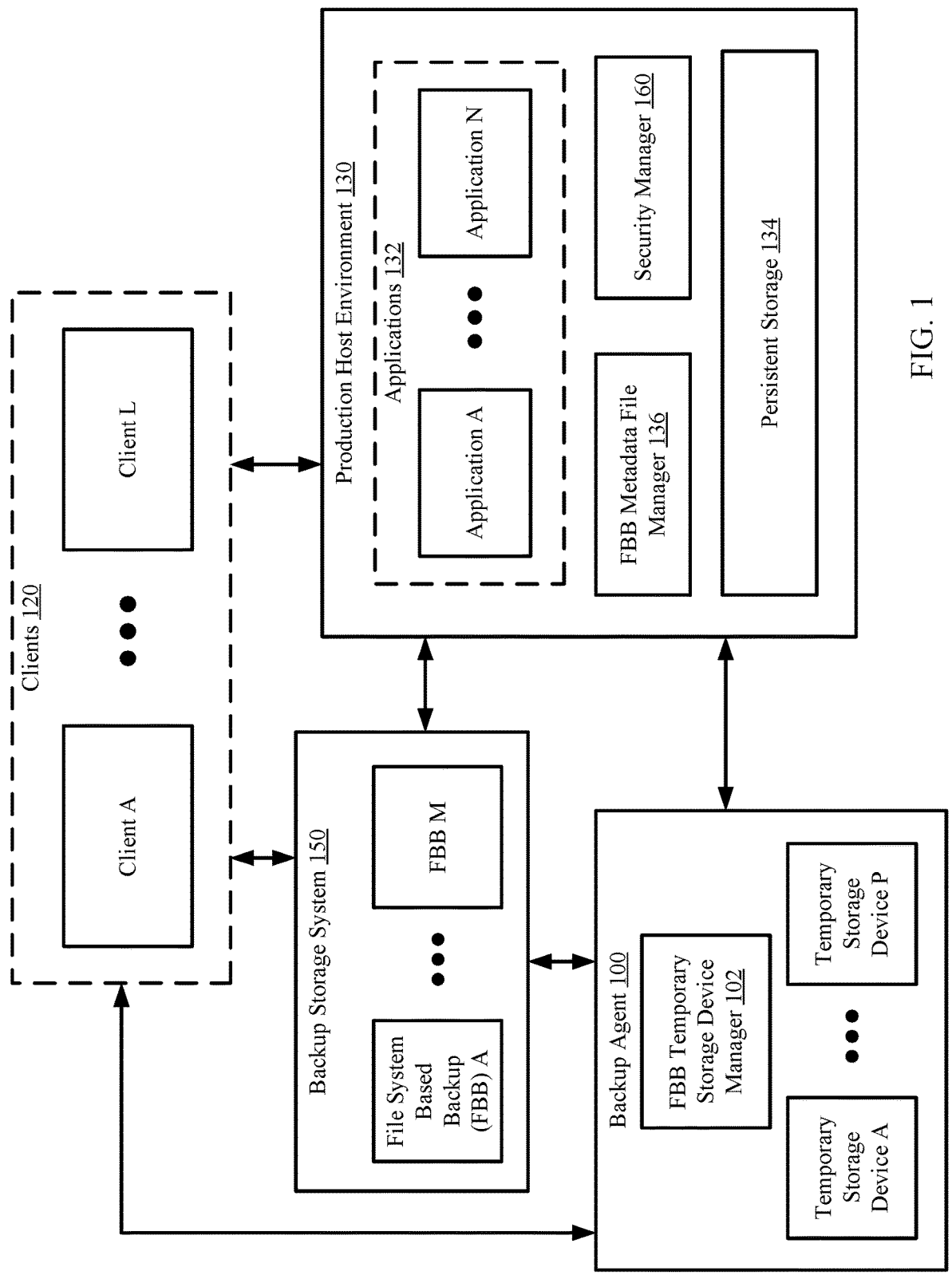
FIG. 1 shows a diagram of a system in accordance with one or more embodiments described herein.

Specific embodiments will now be described with reference to the accompanying figures.

In the below description, numerous details are set forth as examples of embodiments described herein. It will be understood by those skilled in the art (who also have the benefit of this Detailed Description) that one or more embodiments of embodiments described herein may be practiced without these specific details, and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for managing file based backups. One or more embodiments relate to a system for utilizing a file based backup (FBB) metadata file of a FBB stored in a backup storage system to enable access to the data of the FBB. Such access may be provided by an application managing the file system corresponding to the FBB. The application may operate from a production host environment that is operatively connected to the backup storage system. The FBB metadata file may be utilized by obtaining attributes corresponding to the data in the FBB, including the storage location, file name, and file size, and allowing access to those attributes by the applications. A FBB metadata file manager executing on the production host environment may utilize the obtained attributes to enable access to the data (e.g., the files) in the FBB by the applications. For example, the FBB metadata file manager may implement a virtual file system that specifies the files in the file based backup and the storage location in the backup storage system.

Embodiments described herein further may include a method for managing the data accessed by the applications by generating temporary storage devices. A backup agent would manage the generation and execution of the temporary storage devices. The temporary storage devices may be instantiated in the production host environment, in the backup storage system, or in an additional entity without departing from the scope of embodiments described herein.

A temporary storage device manager may generate the temporary storage devices and populate them with requested data from a FBB stored in the backup storage device. The temporary storage device manager may store a copy of the requested data in the temporary storage device. The application requesting the data may read and/or write to the data in the temporary storage device. The temporary storage device may be used in the generation of future FBBs of the file system used by the application.

Embodiments described herein further include methods for generating and storing the FBBs in target backup storage devices regardless of the storage protocol implemented by the backup storage systems. Embodiments described herein include generating the FBB backup, identifying the target backup system to which the FBB is to be stored, identifying the target exposed API(s) provided by the identified backup storage system, and generating an API command based on the identified exposed API(s).

Embodiments described herein further include managing certain aspects of security related to a FBB. Specifically, in one or more embodiments, when an application seeks access to all or any portion of a FBB, a FBB metadata file manager executing in a production host environment obtains an entity context (e.g., security credentials associated with the application and/or a user using the application vi a user interface). In one or more embodiments, the FBB metadata file manager then uses a security manager to authenticate the entity using the entity context. In one or more embodiments, once the entity context is authenticated, the FBB metadata file manager obtains access control information from a FBB metadata file stored with the FBB in backup storage. In one or more embodiments, the FBB metadata file manager then determines a subset of the FBB for which the entity context has access permission(s). In one or more embodiments, access to the subset of the FBB is enabled using any of the access methods described herein. In one or more embodiments, prior to enabling access to the subset of the FBB, the FBB metadata file manager may determine, via a security manager, that the entity context is associated with override FBB subset information that indicates the entity context is allowed to access a portion of the FBB that is different than what the access control information indicates. In one or more embodiments, in such scenarios, access to the portion of the FBB indicated by the override FBB subset information may be made accessible to the application.

FIG. 1 shows an example system in accordance with one or more embodiments described herein. The system includes a backup agent (100), one or more clients (120), a production host environment (130) and a backup storage system (150). The system may include additional, fewer, and/or different components without departing from the scope of embodiments described herein. Each component may be operably connected to any of the other components via any combination of wired and/or wireless connections (e.g., as part of a network). Each component illustrated in FIG. 1 is discussed below.

In one or more embodiments described herein, the backup agent (100) manages backup operations of data in the production host environment (130). The backup operations may include generating, storing, and/or recovering file based backups (FBBs) stored in the backup storage system (150). In one or more embodiments described herein, a FBB is a backup of a file system that has been updated, modified, and/or otherwise accessed by the applications (132) in the production host environment (130). The backup agent (100) may perform the method of FIG. 3C-3D to generate the FBBs.

In one or more embodiments described herein, the backup agent (100) further includes a FBB temporary storage device manager (102) (also referred to as a temporary storage device manager). In one or more embodiments, the temporary storage device manager (102) generates one or more temporary storage devices. Each temporary storage devices may include at least a portion of data in a FBB. The data may be copied from the FBB and stored in the temporary storage device such that the data in the temporary storage devices is accessible by the applications (132). The generation of the temporary storage devices may be performed in accordance with FIG. 3B In one or more embodiments described herein, the backup agent (100) is implemented as a computing device (see e.g., FIG. 5). As used herein, a computing device refers to a single computing device, a collection of computing devices, portion(s) of one or more computing devices, or any other logical grouping of computing resources.

In one or more embodiments, a computing device is any device, portion of a device, or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (iSCSI) storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any or all of the aforementioned examples may be combined to create a system of such devices, which may collectively be referred to as a computing device. Other types of computing devices may be used without departing from the scope of embodiments described herein.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments described herein, the backup agent (100) is implemented as a logical device. The logical device may utilize the computing resources of any number of computing devices and thereby provide the functionality of the backup agent (100) described throughout this application and/or all, or a portion thereof, of the methods illustrated in FIGS. 3A-3D. One of ordinary skill in the art will recognize that a logical device necessarily requires including the physical computing resources in order to execute. Accordingly, the backup agent (100), or any other component described herein as all or any portion of a computing device should be understood to include physical hardware necessary to perform the described functionality of the particular component.

While the backup agent (100) is illustrated in FIG. 1 as being a separate entity, the backup agent (100), and any components thereof, may be executed as part of the production host environment (130), the backup storage system (150), the clients (120), and/or any other entities without departing from the scope of embodiments described herein.

In one or more embodiments described herein, the production host environment (130) hosts applications (132). The applications (132) may be logical entities executed using computing resources (not shown) of the production host environment (130). Each of the applications may be performing similar or different processes. In one or more embodiments described herein, the applications (132) provide services to users (not shown), e.g., of clients (120). For example, the applications (132) may host components. The components may be, for example, instances of databases, email servers, and/or other components. The applications (132) may host other types of components without departing from the scope of embodiments described herein.

In one or more embodiments described herein, the applications (132) generate application data to be utilized for the servicing of the users. The application data may be organized in accordance with a file system. The file system may include any number of files organized into directories. For example, the directories may include paths for accessing the files. The file system may be stored in the persistent storage (134) of the production host environment (130).

In one or more of embodiments described herein, the applications (132) are implemented as computer instructions, e.g., computer code, stored on a persistent storage (e.g., 134) that when executed by a processor(s) of the production host environment (130) cause the production host environment (130) to provide the functionality of the applications (132) described throughout this application.

In one or more embodiments described herein, the production host environment (130) further includes a FBB metadata file manager (136). In one or more embodiments described herein, the FBB metadata file manager (136) obtains FBB metadata files, obtains the relevant metadata attributes, and prepares a FBB virtual file system for the applications (132) to use when accessing data in the FBBs stored in the backup storage system (150). The FBB metadata file manager (136) may perform the method of FIG. 3A to generate the FBB virtual file system. In one or more embodiments, the FBB metadata file manager (136) also includes functionality to obtain an entity context for any attempt to access the FBB by any of the applications (132). In one or more embodiments, an entity context includes any security information relating to what a given entity (e.g., an application, a user using an application via a user interface, etc.). As an example, an entity context may be a username and password of a user using an application on the production host environment (130).

In one or more embodiments, the system includes a security manager (160). As shown in FIG. 1, the security manager (160) is included in the production host environment (130). Alternatively, the security manager (160) may be separate from and operatively connected to the production host environment (130). In one or more embodiments, the security manager includes functionality to receive an entity context from the FBB metadata file manager, and to authenticate the entity. In one or more embodiments, authenticating an entity includes verifying the information included in the entity context. As an example, authenticating an entity may include verifying that a username is valid, and that an associated password is correct. In one or more embodiments, the security manager (160) also includes functionality to provide any override FBB subset information to a FBB metadata file manager, which may override any access control information obtained from the FBB metadata file. For example, administrator entities may have access to additional portions of the FBB than is indicated in the access control information of the FBB metadata file. As another example, access permissions for the FBB may have changed since the FBB and corresponding FBB metadata file were created. In such scenarios, the override FBB subset information may include what subset of the FBB the entity associated with the entity context may currently access.

Figure 5:
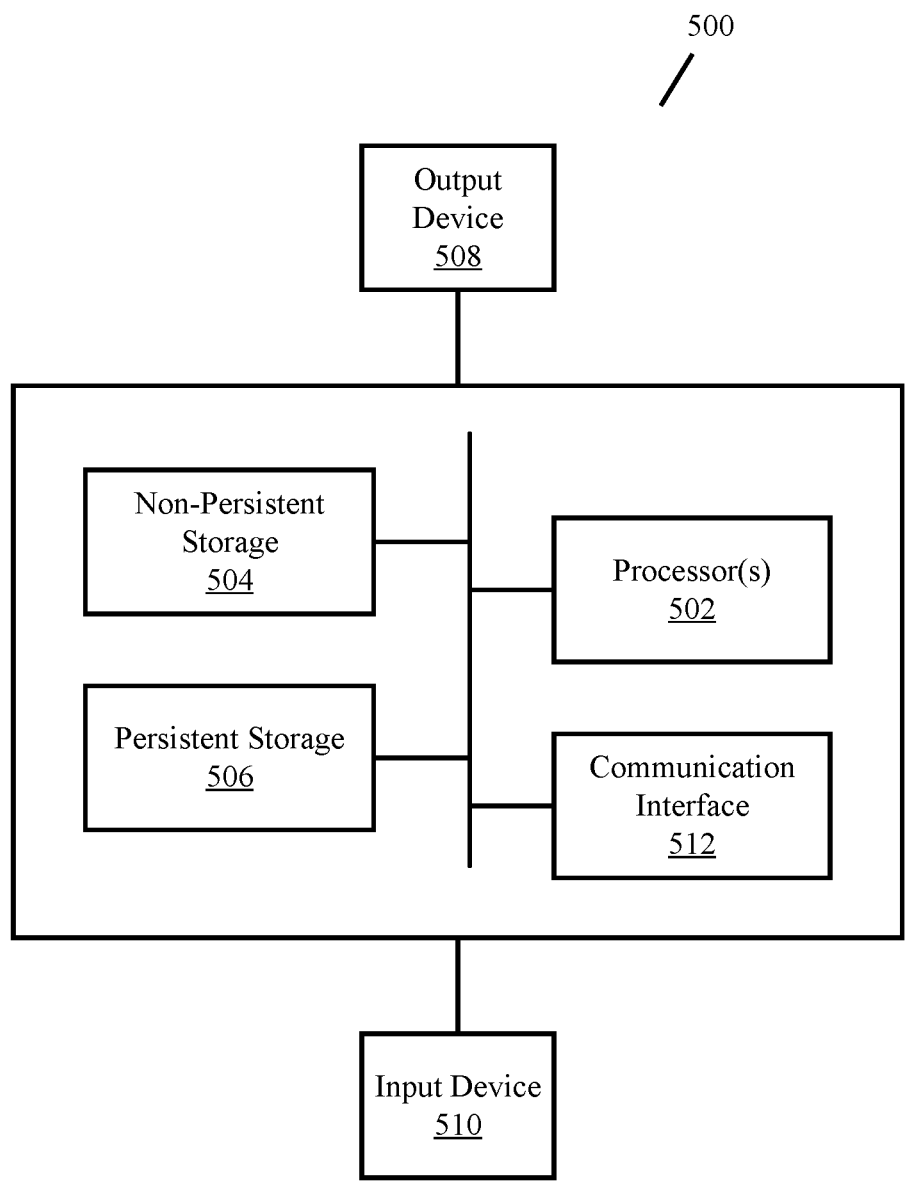
FIG. 5 shows a diagram of a computing device in accordance with one or more embodiments described herein.

In one or more embodiments described herein, the production host environment (130) is implemented as a computing device (described above, also see e.g., FIG. 5). In one or more embodiments described herein, the production host environment (130) is implemented as a logical device. The logical device may utilize the computing resources of any number of computing devices and thereby provide the functionality of the production host environment (130) described throughout this application.

In one or more embodiments described herein, each of the backup storage systems (150) stores FBBs. The FBBs may be backups for file systems. The file systems may be based on files used by the applications (132). The FBBs may each correspond to a point in time of the file system. The FBBs may be used to restore the file system as it existed at the corresponding point in time.

In one or more embodiments described herein, the backup storage system (150) is implemented as a computing device (described above, also see e.g., FIG. 5). In one or more embodiments described herein, the backup storage system (150) is implemented as a logical device. The logical device may utilize the computing resources of any number of computing devices and thereby provide the functionality of the backup storage system (150) described throughout this application.

Figure 2:
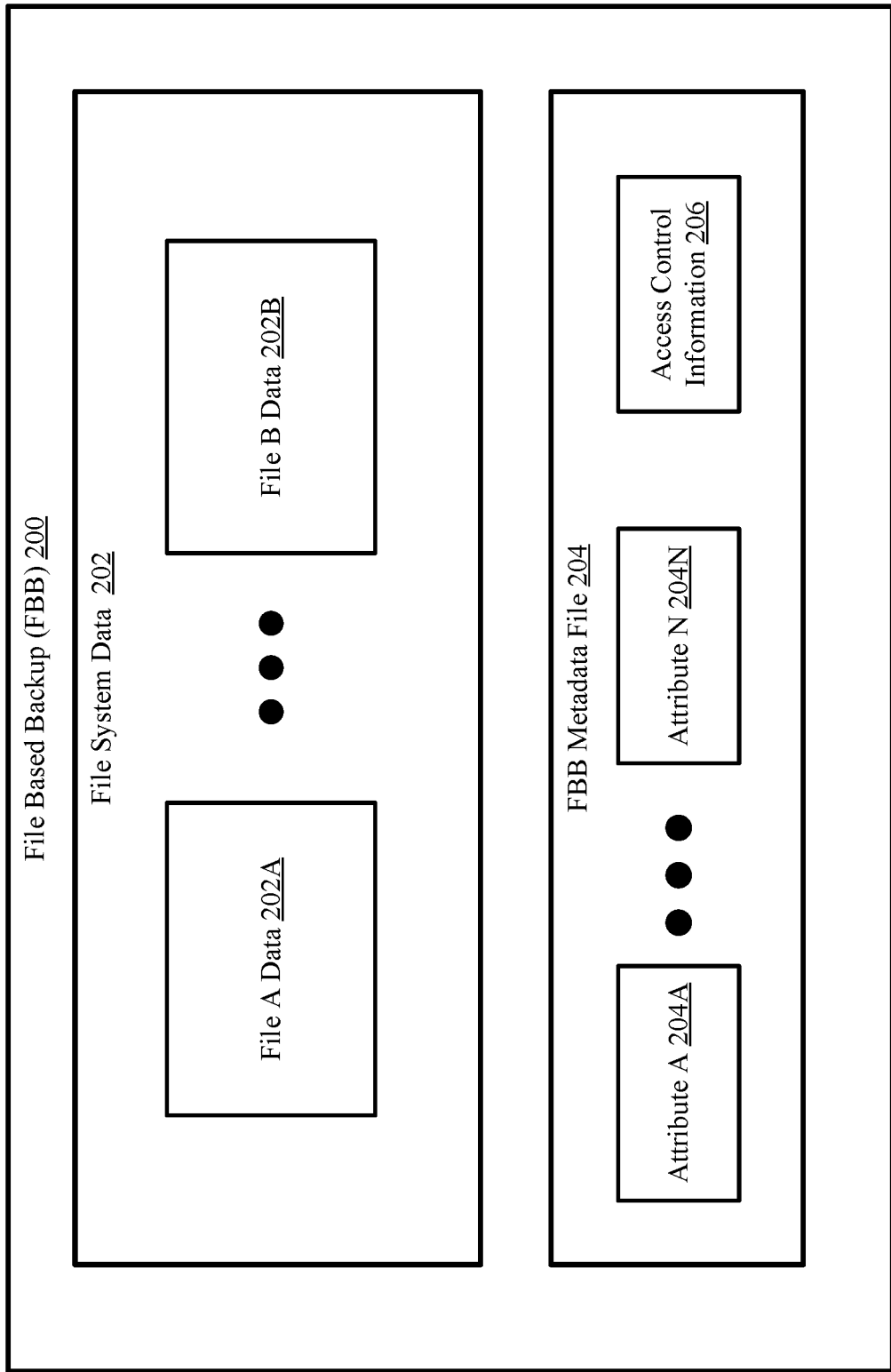
FIG. 2 shows a diagram of a file based backup (FBB) in accordance with one or more embodiments described herein.

FIG. 2 shows a diagram of a file based backup (FBB) in accordance with one or more embodiments described herein. The FBB (200) may be an embodiment of a FBB discussed in FIG. 1. As discussed above, FBB (200) is a data structure that includes the data in a file system at a point in time. The FBB (200) may include file system data (202) and a FBB metadata file (204).

In one or more embodiments described herein, the file system data (202) includes data for one or more files (202A, 202B). Each file data (202A, 202B) may correspond to a file in the file system. The file data (also referred to as file system data) may further include data tags. In one or more embodiments described herein, the data tags may be associated with the storage format of the file data (202A, 202B). For example, the file data (202A, 202B) may be stored in a common data streaming format (CDSF). In one or more embodiments described herein, the CDSF may be a format that includes the data tags that may correspond to a portion of data and may specify the FBB corresponding to the portion of data. In this manner, the file data (202A, 202B) may include: (i) the data of the files and/or file system and (ii) the data tags that specify the metadata of one or more portions of data of the file data (202A, 202B).

In one or more embodiments described herein, the FBB metadata file (204) is a data structure that includes metadata corresponding to the files in the file system data (202). The metadata may include attributes (204A, 204N) of a file. Each attribute may describe an aspect of a file. Examples of attributes (204A, 204N) include, but are not limited to: a file identifier, a parent file identifier, a container identifier, a file size, a hash value of the file data, a checksum value of the file data, a header size, and an offset of the file.

In one or more embodiments described herein, the attributes in the FBB metadata file (204) are grouped into attribute regions. The attribute regions may be groupings of the metadata attributes. The attribute regions may be grouped based on a likelihood of an attribute changing between various iterations of a FBB (e.g., 200).

For example, consider a scenario in which a first attribute (e.g., a file size) changes from a first iteration of a file system of a first FBB to a second iteration of the file system of a second FBB. In contrast, a second attribute (e.g., a file name) may remain the same between the two iterations of the file system. In such scenario, based on their likelihood to change in future iterations of the file system, the first attribute may correspond to a first attribute region, and the second attribute may correspond to a second attribute region.

In one or more embodiments, the FBB metadata file also includes access control information (206). In one or more embodiments, access control information is any information stored in any format or data structure type that includes a mapping of entities and access permissions for portions of the FBB. As an example, each file, folder, sub-folder, etc. in the FBB may have an associated access control list (ACL) that includes a listing of entities that have permission to access the portion, that specifically may not access the portion, etc. Access control information may be considered an attribute, as described above, of a particular file, folder, etc. of the FBB.

FIGS. 3A-3E show flowcharts in accordance with one or more embodiments described herein. While the various steps in the flowcharts are presented and described sequentially, one of ordinary skill in the relevant art will appreciate that some or all of the steps may be executed in different orders, may be combined or omitted, and some or all steps may be executed in parallel. In one or more embodiments described herein, the steps shown in FIGS. 3A-3D may be performed in parallel with any other steps shown in FIGS. 3A-3D without departing from the scope embodiments described herein.

Figure 3A:
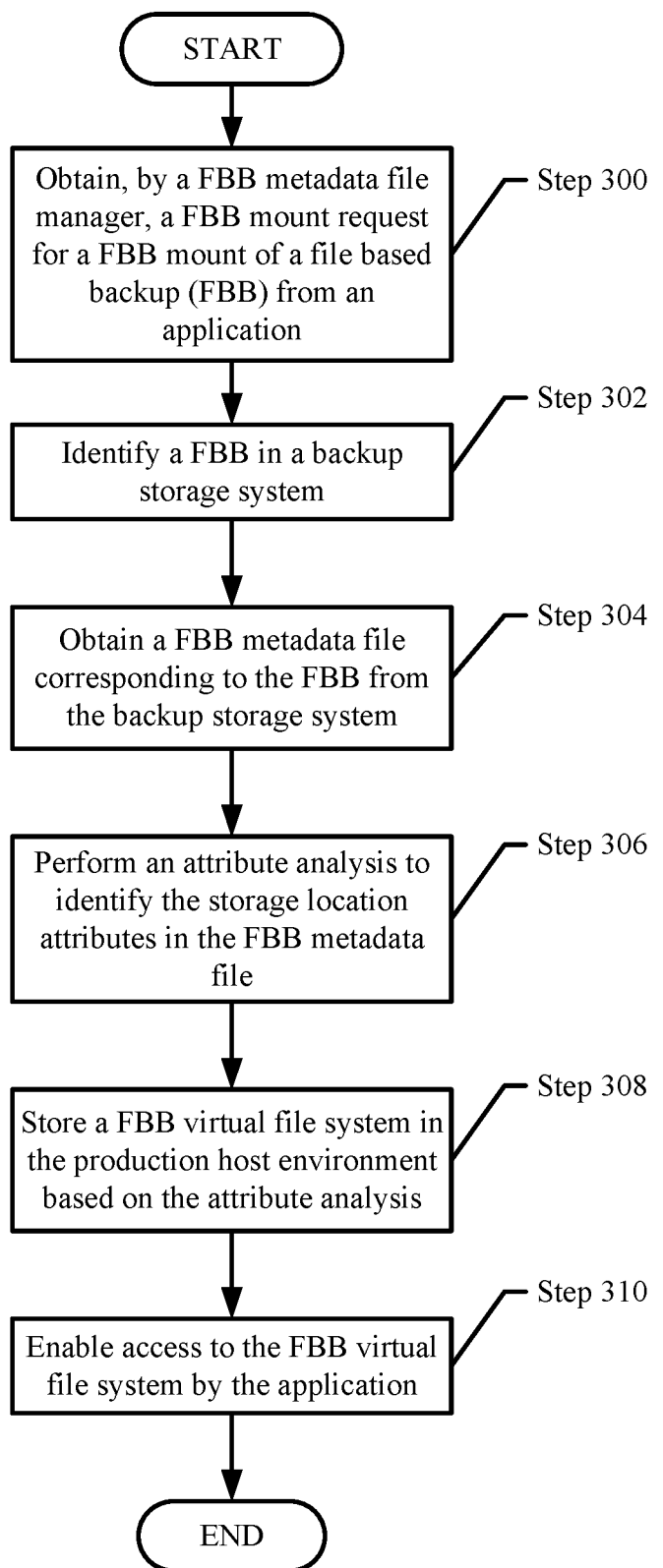
FIG. 3A shows a flowchart for managing instant access of a file based backup in accordance with one or more embodiments described herein.

FIG. 3A shows a flowchart for managing instant access for a file based backup in accordance with one or more embodiments described herein. The method shown in FIG. 3A may be performed by, for example, a FBB metadata file manager (e.g., 136, FIG. 1). Other components of the system illustrated in FIG. 1 may perform the method of FIG. 3A without departing from the scope of embodiments described herein.

Turning to FIG. 3A, in step 300, a FBB mount request for a FBB mount for a FBB is obtained from an application. In one or more embodiments described herein, the FBB mount request specifies mounting a subset of the file system of the FBB (which may be referred to as a subset of the FBB) in the production host environment such that the application has access to the data (e.g., files) in the FBB. The FBB mount request may specify the point in time associated with the file system.

In step 302, a FBB in a backup storage system is identified. In one or more embodiments described herein, the FBB is identified based on the specified point in time in the FBB mount request. Further, the FBB may be identified based on the specified file system. The FBB metadata file manager (or other entity) may analyze the FBBs stored in the backup storage system to identify a FBB that corresponds to the requested file system and/or point in time.

In step 304, a FBB metadata file corresponding to the FBB is obtained from the backup storage system. In one or more embodiments described herein, the FBB metadata file manager may send a request (e.g., as an API command) to the backup storage system that specifies the FBB metadata file of the identified FBB. Any other technique for obtaining information may be used to obtain the FBB metadata file without departing from the scope of embodiments described herein.

In step 306, an attribute analysis is performed on attributes specified in the FBB metadata file to identify storage location attributes in the FBB metadata file. In one or more embodiments described herein, the attribute analysis is a process for analyzing the attributes specified in the FBB metadata file that specify the storage location of the data and enable access to the data. Such attributes may include, but are not limited to: an offset of a portion of data in a storage device, a size of the portion of data, a file name corresponding to the portion of data, and a file path based on the file system.

In step 308, a FBB virtual file system is stored in the production host environment based on the attribute analysis. In one or more embodiments described herein, the FBB virtual file system is an organization of the storage attributes such that the application may access (e.g., read) data of the file system from the FBB. The FBB virtual file system would be organized on a file-storage basis such that the FBB virtual file system would specify each file in the file system of the FBB and the storage of the data corresponding to each file.

In step 310, access to the FBB virtual file system by the application is enabled. In one or more embodiments described herein, the access includes establishing the organization of the FBB virtual file system so that the application may send read requests for the data (e.g., one or more files) in the FBB. The entity servicing the read request (e.g., a driver in the production host environment) may utilize the FBB virtual file system to identify the file(s), the storage location of the data corresponding to the file(s), and send API requests to the backup storage system to obtain the specified data.

In one or more embodiments described herein, the access to the FBB virtual file system may include obtaining a read request for the file system data in the FBB. The file system data may include files. The entity (e.g., the FBB metadata file manager) managing the FBB virtual file system may identify a file path corresponding to the requested data. The file path may specify the portions of data corresponding to the requested files. Based on the identified file path, the requested data may be obtained from the backup storage system. For example, a copy of the requested data may be generated and provided to the application.

Figure 3B:
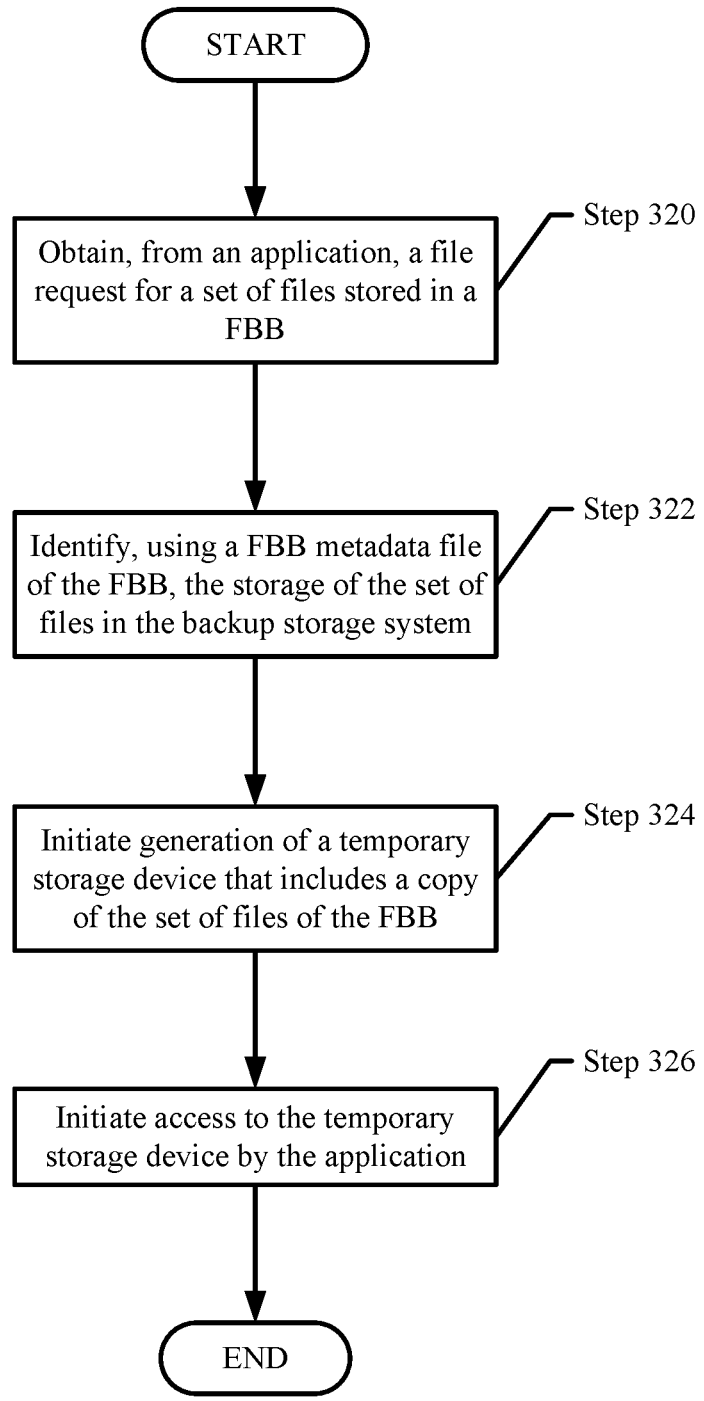
FIG. 3B shows a flowchart for managing temporary storage devices in accordance with one or more embodiments described herein.

In one or more embodiments described herein, the read request may be serviced in accordance with FIG. 3B. The read request may be serviced in accordance with any other method without departing from the scope of embodiments described herein.

FIG. 3B shows a flowchart for managing temporary storage devices in accordance with one or more embodiments described herein. The method shown in FIG. 3B may be performed by, for example, a FBB temporary storage device manager (e.g., 102, FIG. 1). Other components of the system illustrated in FIG. 1 may perform the method of FIG. 3B without departing from the scope of embodiments described herein.

In step 320, a file request for a set of one or more files stored in a FBB is obtained from an application. The file request may specify a desire to write, read from, and/or otherwise access the set of files from the FBB.

In step 322, the storage of the set of files is identified in the backup storage system. In one or more embodiments described herein, the storage of the set of files is identified using a FBB virtual file system. The FBB virtual file system may specify each of the set of files and the storage locations of the set of files in the backup storage system.

In step 324, generation of a temporary storage device is initiated that includes a copy of the set of files of the FBB. In one or more embodiments described herein, the temporary storage device is generated by partitioning a portion of the storage of the backup agent (or other entity managing the temporary storage devices) to be reserved for the set of files. The temporary storage device may be populated with a copy of the data from the FBB. The copy may be generated without the data tags of the file system data. In this manner, the data corresponding to the set of files may be organized to enable access to the data by the application without the data tags interrupting the access to the data.

In step 326, access to the temporary storage device is initiated by the application. In one or more embodiments described herein, the generation of the temporary storage device results in an update to the FBB virtual file system such that the application may access the data in the temporary storage device via the FBB virtual file system. In one or more embodiments described herein, the access includes allowing the application to read from, write to, and/or otherwise modify the data in the temporary storage device via the FBB virtual file system. Any modifications to the data by the application may be stored and tracked in the temporary storage device.

In one or more embodiments described herein, the temporary storage device may be deleted following a generation of a FBB of the file system to which the data in the temporary storage device corresponds to. The FBB may be generated in accordance with FIG. 3B and/or FIG. 3C. The FBB may be generated via any other process without departing from the scope of embodiments described herein. Further, the temporary storage device may be deleted based on any other policy without departing from the scope of embodiments described herein.

Figure 3C:
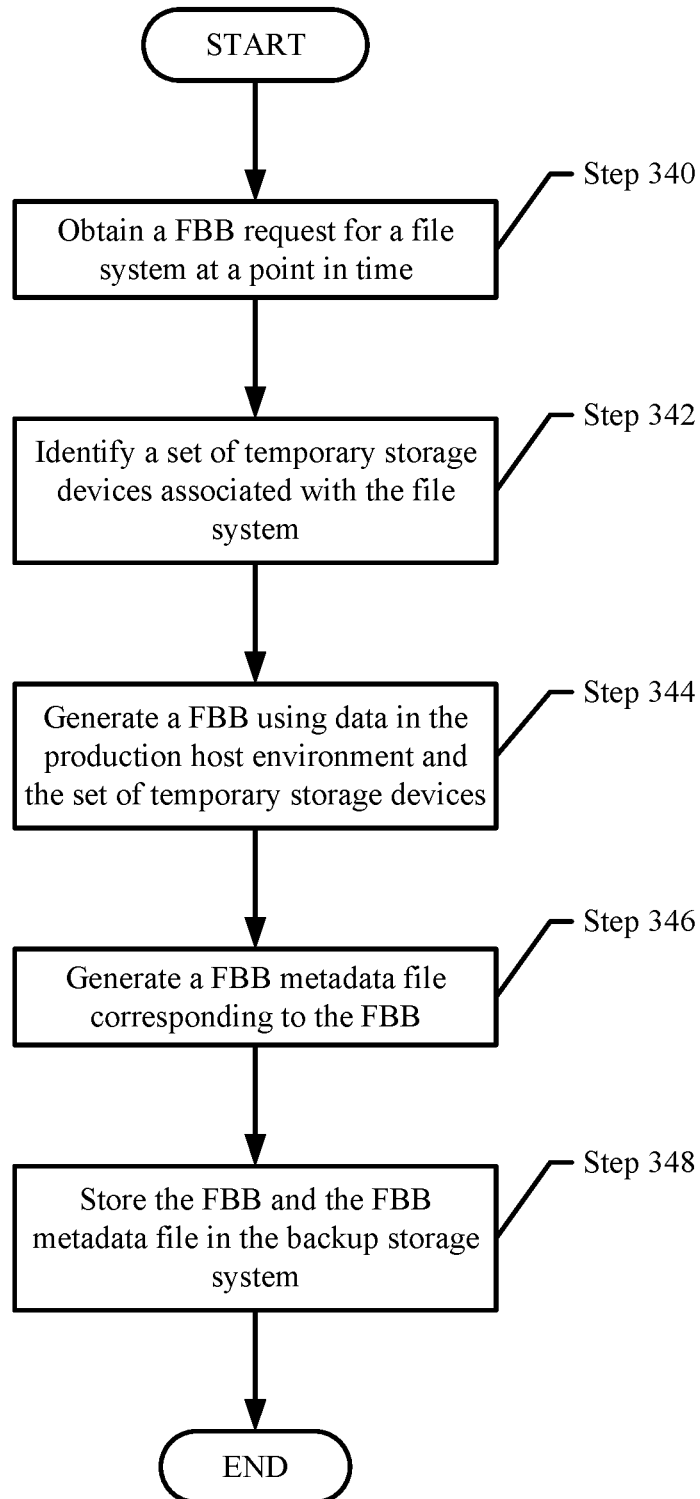
FIG. 3C shows a flowchart for generating and storing a file based backup in accordance with one or more embodiments described herein.

FIG. 3C shows a flowchart for generating and storing a file based backup in accordance with one or more embodiments described herein. The method shown in FIG. 3C may be performed by, for example, a backup agent (e.g., 100, FIG. 1). Other components of the system illustrated in FIG. 1 may perform the method of FIG. 3C without departing from the scope of embodiments described herein.

In step 340, a FBB request is obtained for a file system at a point in time. The FBB request may specify generating and storing a FBB of the file system at the point in time. The FBB request may specify the backup storage system in which the FBB is to be stored.

In step 342, a set of temporary storage devices associated with the file system is identified. In one or more embodiments described herein, the set of temporary storage devices that are identified are those that have been generated based on the file system. The temporary storage devices may be identified based on temporary storage device identifiers of the temporary storage devices. Each of the temporary storage devices may specify the file system and/or a set of data corresponding to the file system.

In step 344, generating a FBB using data in the production host environment and the set of temporary storage devices. In one or more embodiments described herein, the FBB is generated by generating a copy of the data in the production host environment, generating a copy of the data in the set of temporary storage devices, replacing any data in the production host environment with the corresponding data in the set of temporary storage devices.

In step 346, a FBB metadata file corresponding to the FBB is generated. In one or more embodiments described herein, the FBB metadata file is generated by generating metadata attributes corresponding to each file in the file system. The metadata file may be populated based on the corresponding attributes of the copy of the data generated in step 344 (e.g., file name identifiers, file size, etc.). The storage location attributes of the FBB metadata file may be generated based on the storage of the FBB in the backup storage system as performed in step 348.

In step 348, the FBB and the FBB metadata file is stored in the backup storage system. In one or more embodiments described herein, the storage includes storing the FBB in a CDSF. The storage of the FBB may include generating data tags for portions of the data in the FBB, storing the data tags with the portions of the data, and tracking the storage of the data in the FBB metadata file.

Figure 3D:
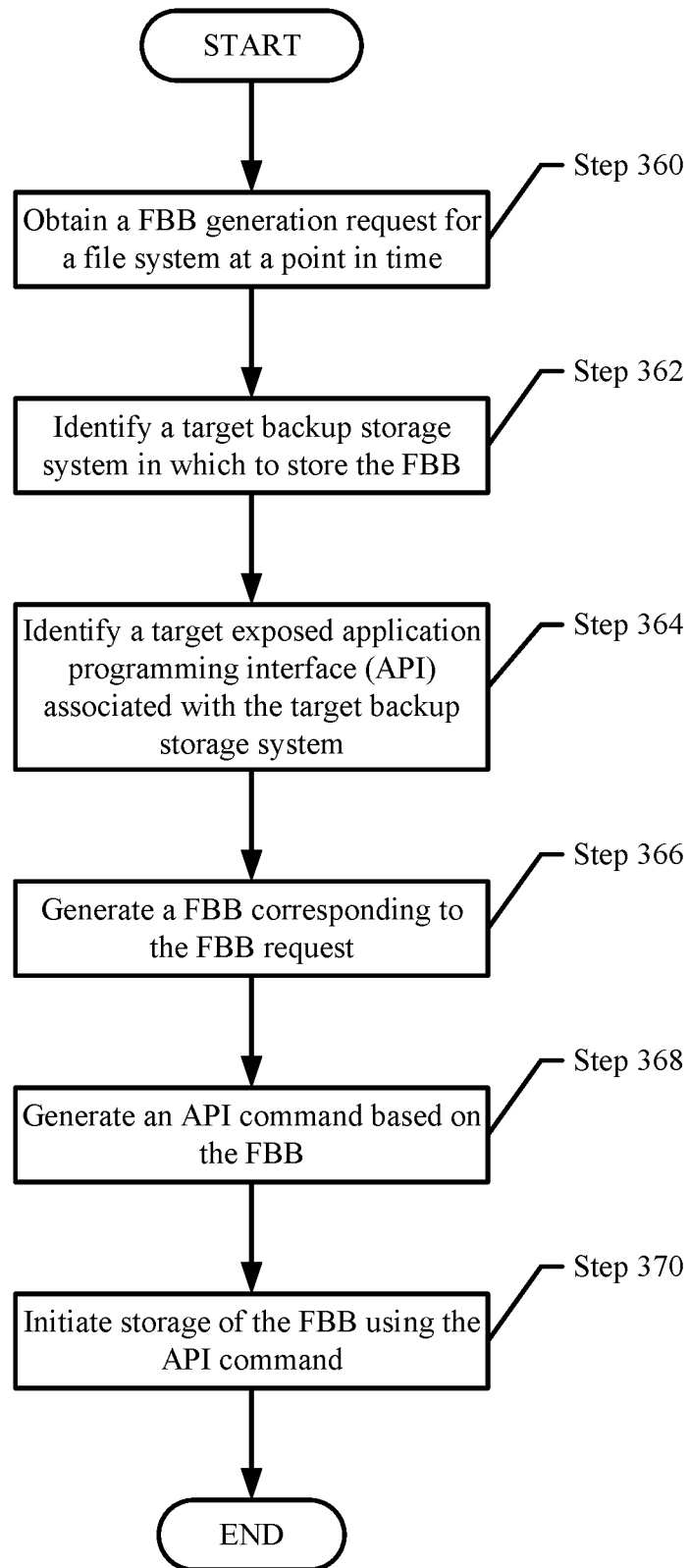
FIG. 3D shows a flowchart for generating and storing a file based backup based on a target backup storage system in accordance with one or more embodiments described herein.

FIG. 3D shows a flowchart for generating and storing a file based backup based on a target backup storage system in accordance with one or more embodiments described herein. The method shown in FIG. 3D may be performed by, for example, a backup agent (e.g., 100, FIG. 1). Other components of the system illustrated in FIG. 1 may perform the method of FIG. 3D without departing from the scope of embodiments described herein.

In step 360, a FBB generation request for a file system at a point in time is obtained. The FBB generation request may specify generating and storing a FBB of the file system at the point in time. The FBB request may specify the backup storage system in which the FBB is to be stored. Alternatively, the backup storage system may not be specified in the FBB generation request.

In step 362, a target backup storage system in which to store the FBB is identified. In such embodiments in which the FBB generation request does not specify the target backup storage system, the backup agent may identify the target backup storage system by identifying the connection to one or more backup storage systems, determining one of the backup storage systems that may store the FBB in a CDSF. The backup agent may select, from the determined backup storage systems, a target storage system.

In step 364, a target exposed API associated with the target backup storage system is identified. In one or more embodiments described herein, following the selection and/or identification of the target backup storage system, the backup agent may identify a target exposed API of the target backup storage system by establishing a connection with the target backup storage system, sending a request of the API protocol implemented by the target backup storage system, and obtaining a response from the target backup storage system.

In step 366, a FBB is generated corresponding to the FBB generation request. In one or more embodiments described herein, the FBB is generated by generating a copy of the data in the production host environment, generating a copy of the data in a set of temporary storage devices, replacing any data in the production host environment with the corresponding data in the set of temporary storage devices.

In step 368, an API command is generated based on the FBB. In one or more embodiments described herein, the API command specifies the storage of the FBB in the CDSF. The API command may be generated based on the exposed API identified for the target backup storage system.

In step 370, storage of the FBB is initiated using the API command. In one or more embodiments described herein, the API command is sent to the target backup storage system. The API command may include, or otherwise reference, the FBB. The target backup storage system may perform the storage of the FBB in the CDSF.

Figure 3E:
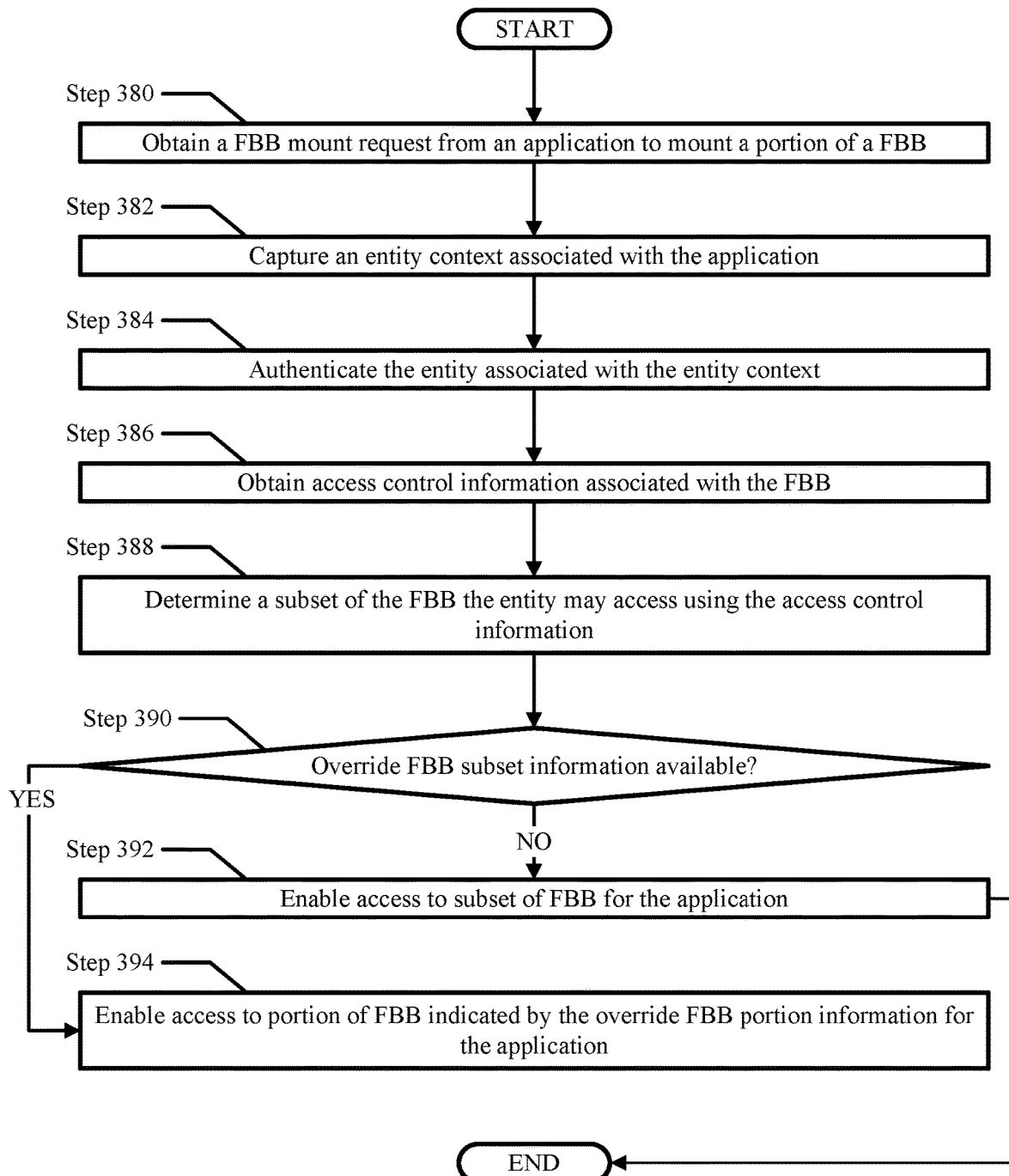
FIG. 3E shows a flowchart for providing security for instant access of file based backups in accordance with one or more embodiments described herein.

FIG. 3E shows a flowchart describing a method for providing secure instant access to a FBB in accordance with one or more embodiments described herein.

In step 380, an FBB mount request is obtained from an application to mount all or any portion a portion of a FBB. In one or more embodiments, the request is made by the application, or a user thereof, attempting to gain instant access to the FBB for portion thereof. In one or more embodiments, the request is obtained by the FBB metadata file manager. In one or more embodiments, the FBB metadata file manager monitors the applications of the production host environment for any requests to access the FBB, and obtains such requests.

In step 382, the FBB metadata file manager captures an entity context associated with the application from which the request was obtained in Step 380. In one or more embodiments, the entity context is obtained via any scheme for obtaining entity context information from any source of such information. As an example, the FBB metadata file manager may, in response to the request, query the application from which the request was obtained in order to receive the entity context (e.g., a user name and password of a user using the application) associated with the application. As another example, the application may be associated with a security token that exists to identify the application for any authentication attempt.

In step 384, the entity associated with the entity context is authenticated. In one or more embodiments, authenticating the entity includes using the obtained entity context, and verifying that the entity is properly authenticated. As an example, authenticating an entity using an entity context may include verifying that a username of the entity context is a known username in a given domain, and that the password of the entity context is the correct password for the username. In one or more embodiments, although not shown in FIG. 3E, if the entity cannot be properly authenticated, the request to access the FBB may be denied. In one or more embodiments, the entity context may be authenticated by a request for authentication made from the FBB metadata file manager to a security manager. The security manager may be able to authenticate the entity context, and/or may engage an external authentication service to authenticate the entity context.

In step 386, access control information associated with the FBB for which instant access was requested is obtained. In one or more embodiments, the access control information is included in the FBB metadata file stored with the FBB in backup storage. In one or more embodiments, the entire FBB metadata file is obtained by the FBB metadata file manager, and then parsed to obtain the access control information therein. In one or more embodiments, the FBB metadata file manager extracts only the access control information and stores it on the production host environment. In one or more embodiments, the FBB metadata file manager builds a temporary access control information store on the production host environment.

In step 388, a subset of the FBB that the entity has permission to access is obtained. In one or more embodiments, the entity context, or any portion thereof, is used, along with the access control information, to determine the subset of the FBB that the application that generated the request in Step 380 may access. As an example, a portion of an entity context associated with a user of the application may be used as a key to identify a subset of the files and folders stored in the FBB that the user has permission(s) to access, and the subset may be identified using the portion of the entity context and the access control information.

In step 390, a determination is made as to whether override FB subset information is available. In one or more embodiments, override FBB subset information includes information associated with a given entity regarding what portions of a FBB the entity may access, which supersedes whatever subset of the FBB information the access control information indicated the entity had permission to access. Override FBB subset information may be configurable. As such, any entity may be configured, via override FBB subset information, to have permission to access any portion of the FBB. As an example, a system administrator may be associated with access to the entire FBB regardless of what the access control information indicates. As another example, the access control information may be outdated, as changes may have occurred to the access control scheme since the last FBB (and associated FBB metadata file) was stored. In one or more embodiments, the FBB metadata file manager determines whether override FBB subset information is available by querying the security manager. In one or more embodiments, if override FBB subset information is available, the method proceeds to step 394. In one or more embodiments, if there is no override FBB subset information, the method proceeds to step 392.

In step 392, access is enabled to the subset of the FBB that the authenticated entity has permission to access, based on the access control information obtained from the FBB metadata file by the FBB metadata file manager. In one or more embodiments, access is provided using any scheme of any embodiment described herein. As examples, access may be enabled using a virtual file system, temporary storage, etc. (see, e.g., FIGS. 3A-3D).

In step 394, access is enabled to the portion of the FBB that the authenticated entity has permission to access, based on the override FBB subset information obtained from the security manager by the FBB metadata file manager. In one or more embodiments, access is provided using any scheme of any embodiment described herein. As examples, access may be enabled using a virtual file system, temporary storage, etc. (see, e.g., FIGS. 3A-3D).

In one or more embodiments, the method ends following step 392 or step 394.

EXAMPLE

Figure 4:
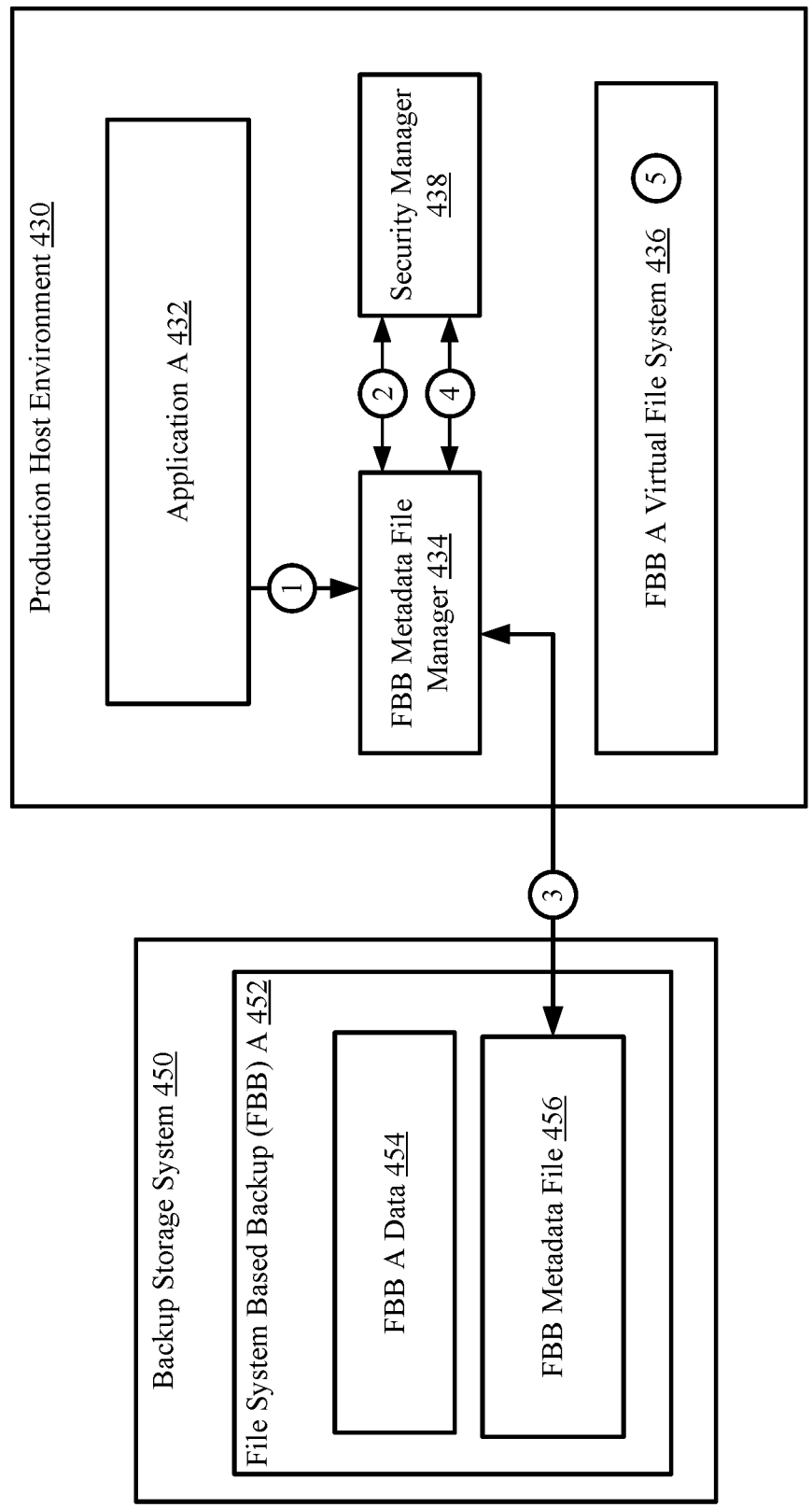
FIG. 4 shows an example in accordance with one or more embodiments described herein.

The following section describes an example. The example, illustrated in FIGS. 4A-4C, is not intended to limit the scope of embodiments described herein and is independent from any other examples discussed in this application. Turning to the example, consider a scenario in which a backup storage system stores a file based backup (FBB) in a common data streaming format (CDSF).

FIG. 4A shows a diagram of an example system. The example system includes a backup storage system (450) and a production host environment (430). For the sake of brevity, not all components of the example system are illustrated in FIG. 4A. The backup storage system (450) includes FBB A (452) which includes FBB A data (454) and a FBB metadata file (456). The production host environment includes an application A (432), a FBB metadata file manager (434), and a security manager (438).

Application A (432) sends a FBB mount request to the FBB metadata file manager (434) that specifies the mounting of FBB A (452) for access by application A (432) [1].

The FBB metadata file manager then captures an entity context associated with application A (432), and uses the entity context to request the security manager (438) to authenticate the entity associated with the entity context. In this example, the authentication is successful. [2]

Next, the FBB metadata file manager (434) obtains access control information for FBB A (452) from the FBB metadata file (456), and determines a subset of the FBB that the entity has permission to access. [3]

Next the FBB metadata file manager (434) checks with the security manager (438) to determine whether override FBB subset information exists associated with the entity context. In this example, there is no override FBB subset information available. [4]. Therefore, the FBB metadata file manager enables access to the subset of the FBB determined using the access control information.

To enable access, the FBB metadata file manager (434) performs the method of FIG. 3A to mount a subset of FBB A (452). [5] Specifically, the FBB metadata file manager (434) obtains relevant attributes from the FBB metadata file (456) such as the storage location, file names, and file paths of the FBB A data (454). The FBB metadata file manager (434) utilizes the relevant attributes to generate a FBB A virtual file system (436) [3]. The FBB virtual file system (436) specifies each file in the file system of the FBB (452) and the storage location of each file in the backup storage system (450). The FBB virtual file system (436) further includes the file paths used for accessing by the application (432).

End of Example

As discussed above, embodiments described herein may be implemented using computing devices. FIG. 5 shows a diagram of a computing device in accordance with one or more embodiments described herein. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one or more embodiments described herein, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one or more embodiments described herein, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments described herein may improve the operation of one or more computing devices. More specifically, embodiments described herein improve the operation of the storage and access of data for file systems stored in backups stored in a backup storage system. Embodiments described herein provide a use of a virtual file system that is tailored to access data for a file based backup that is stored in a format that would otherwise make access to such data difficult, and secures such access based on entity contexts associated with applications requesting instant FBB access.

Embodiments described herein further include providing temporary storage devices for requested data in the file based backup to be accessed by applications. The use of the temporary storage devices prevent modifications to the data in the file based backups, which would be undesirable when restoring the file system to a previous point in time. Further, the data in the temporary storage device may be used for future backups of the file system.

While embodiments described herein have been discussed above with respect to a limited number of embodiments, those skilled in the art, having the benefit of this disclosure, will appreciate that other embodiments can be devised which do not depart from the scope of embodiments described herein. Accordingly, the scope of such embodiments should be limited only by the attached claims.

What is claimed is:
1. A method for managing file based backups (FBBs), the method comprising:
   obtaining, by a FBB metadata file manager, a FBB mount request for a FBB mount of a FBB from an application, wherein the application is executing in a production host environment and the FBB is stored on backup storage;
   in response to the FBB mount request:
      capturing, by the FBB metadata file manager, an entity context associated with the application;
      authenticating, by the FBB metadata file manager, the entity context;
      obtaining, by the FBB metadata file manager and when the authenticating is successful, access control information corresponding to the FBB from the backup storage;
      determining, by the FBB metadata file manager, a subset of the FBB for which the access control information indicates the entity context has permission to access; and
      enabling, by the FBB metadata file manager, access to a portion of the FBB by the application.

2. The method of claim 1, wherein the FBB comprises file system data and the FBB metadata file.

3. The method of claim 2, wherein the FBB metadata file comprises the access control information.

4. The method of claim 1, wherein the portion of the FBB is the subset of the FBB.

5. The method of claim 1, further comprising:
   obtaining, before determining the subset of the FBB and from a security manager, override FBB subset information associated with the entity context,
   wherein:
      the portion of the FBB is a different subset of the FBB, and
      the different subset is based on the override FBB subset information.

6. The method of claim 1, wherein enabling the access to the portion of the FBB comprises storing a FBB virtual file system in the production host environment.

7. The method of claim 1, wherein enabling the access to the portion of the FBB comprises:
- initiating, by the FBB metadata file manager, generation of a temporary storage device; and
- storing a copy of the portion of the FBB in the temporary storage device.

8. A non-transitory computer readable medium comprising computer readable program code, which when executed by a computer processor enables the computer processor to perform a method for managing file based backups (FBBs), the method comprising:
- obtaining, by a FBB metadata file manager, a FBB mount request for a FBB mount of a FBB from an application, wherein the application is executing in a production host environment and the FBB is stored on backup storage;
- in response to the FBB mount request:
  - capturing, by the FBB metadata file manager, an entity context associated with the application;
  - authenticating, by the FBB metadata file manager, the entity context;
  - obtaining, by the FBB metadata file manager and when the authenticating is successful, access control information corresponding to the FBB from the backup storage;
  - determining, by the FBB metadata file manager, a subset of the FBB for which the access control information indicates the entity context has permission to access; and
  - enabling, by the FBB metadata file manager, access to a portion of the FBB by the application.

9. The non-transitory computer readable medium of claim 8, wherein the FBB comprises file system data and the FBB metadata file.

10. The non-transitory computer readable medium of claim 9, wherein the FBB metadata file comprises the access control information.

11. The non-transitory computer readable medium of claim 8, wherein the portion of the FBB is the subset of the FBB.

12. The non-transitory computer readable medium of claim 8, wherein the method performed by executing the computer readable program code further comprises:
- obtaining, before determining the subset of the FBB and from a security manager, override FBB subset information associated with the entity context,
- wherein:
  - the portion of the FBB is a different subset of the FBB, and
  - the different subset is based on the override FBB subset information.

13. The non-transitory computer readable medium of claim 8, wherein enabling the access to the portion of the FBB comprises storing a FBB virtual file system in the production host environment.

14. The non-transitory computer readable medium of claim 8, wherein enabling the access to the portion of the FBB comprises:
- initiating, by the FBB metadata file manager, generation of a temporary storage device; and
- storing a copy of the portion of the FBB in the temporary storage device.

15. A system for managing file based backups (FBBs), the system comprising:
- a processor;
- memory; and
- a FBB metadata file manager executing using the processor and the memory and configured to:
  - obtain a FBB mount request for a FBB mount of a FBB from an application, wherein the application is executing in a production host environment and the FBB is stored on backup storage;
  - in response to the FBB mount request:
    - capture an entity context associated with the application;
    - authenticate the entity context;
    - obtain, when the authentication is successful, access control information corresponding to the FBB from the backup storage;
    - determine a subset of the FBB for which the access control information indicates the entity context has permission to access; and
    - enable access to a portion of the FBB by the application.

16. The system of claim 15, wherein:
- the FBB comprises file system data and the FBB metadata file, and
- the FBB metadata file comprises the access control information.

17. The system of claim 15, wherein the portion of the FBB is the subset of the FBB.

18. The system of claim 15, wherein the FBB metadata file manager is further configured to:
- obtain, before determining the subset of the FBB and from a security manager, override FBB subset information associated with the entity context,
- wherein:
  - the portion of the FBB is a different subset of the FBB, and
  - the different subset is based on the override FBB subset information.

19. The system of claim 15, wherein enabling the access to the portion of the FBB comprises storing a FBB virtual file system in the production host environment.

20. The system of claim 15, wherein, to enable the access to the portion of the FBB, the FBB metadata file manager is further configured to:
- initiate, by the FBB metadata file manager, generation of a temporary storage device; and
- store a copy of the portion of the FBB in the temporary storage device.

* * * * *